(12) United States Patent
Kaplancali et al.

(10) Patent No.: US 11,123,905 B2
(45) Date of Patent: Sep. 21, 2021

(54) POLYLACTIC ACID MOULDING PROCESS

(71) Applicant: Dandelion Research Limited, Hong Kong (HK)

(72) Inventors: Kemal Kaya Kaplancali, Hong Kong (CN); Dominic Mount Tsun Mak, Hong Kong (CN)

(73) Assignee: Dandelion Research Limited, Hong Kong (CN)

( * ) Notice: Subject to any disclaimer, the term of this patent is extended or adjusted under 35 U.S.C. 154(b) by 311 days.

(21) Appl. No.: 16/089,736

(22) PCT Filed: Mar. 31, 2017

(86) PCT No.: PCT/IB2017/051877
§ 371 (c)(1),
(2) Date: Sep. 28, 2018

(87) PCT Pub. No.: WO2017/168398
PCT Pub. Date: Oct. 5, 2017

(65) Prior Publication Data
US 2019/0118435 A1    Apr. 25, 2019

Related U.S. Application Data

(60) Provisional application No. 62/316,412, filed on Mar. 31, 2016.

(51) Int. Cl.
*B29C 45/76*    (2006.01)
*B29C 45/00*    (2006.01)
(Continued)

(52) U.S. Cl.
CPC ...... *B29C 45/0001* (2013.01); *B29C 45/2606* (2013.01); *B29C 45/7207* (2013.01);
(Continued)

(58) Field of Classification Search
CPC ............ B29C 45/0001; B29C 45/2606; B29C 45/7207; B29C 45/76; B29C 45/78;
(Continued)

(56) References Cited

U.S. PATENT DOCUMENTS 5,916,950 A * 6/1999 Obuchi ................... C08L 67/04
524/492
8,084,551 B2   12/2011 Ara et al.
(Continued)

FOREIGN PATENT DOCUMENTS

CN    101554763 A    10/2009
CN    101970547 A    2/2011
(Continued)

*Primary Examiner* — Nahida Sultana
*Assistant Examiner* — Margaret B Hayes
(74) *Attorney, Agent, or Firm* — Sterne, Kessler, Goldstein & Fox P.L.L.C.

(57) ABSTRACT

Novel polylactic acid biopolymer systems and methods of producing products with polylactic acid biopolymers are disclosed. Products produced according to the systems and methods disclosed herein have enhanced deflection temperature and improved mechanical performance when compared to conventional injection moulding processes. Systems and methods for compounding polylactic acid biopolymer and creating an object using a polylactic acid biopolymer by extrusion and injection moulding process are described.

19 Claims, 17 Drawing Sheets

(51) Int. Cl.
*B29C 45/26* (2006.01)
*B29C 45/72* (2006.01)
*B29C 45/78* (2006.01)
*C08K 3/26* (2006.01)
*C08K 5/00* (2006.01)
*C08L 67/04* (2006.01)
*B29K 67/00* (2006.01)
*B29L 31/52* (2006.01)

(52) U.S. Cl.
CPC .............. *B29C 45/76* (2013.01); *B29C 45/78* (2013.01); *C08K 3/26* (2013.01); *C08K 5/0041* (2013.01); *C08L 67/04* (2013.01); *B29C 2945/76531* (2013.01); *B29C 2945/76625* (2013.01); *B29C 2945/76732* (2013.01); *B29C 2945/76765* (2013.01); *B29K 2067/046* (2013.01); *B29K 2995/006* (2013.01); *B29K 2995/0015* (2013.01); *B29K 2995/0037* (2013.01); *B29K 2995/0041* (2013.01); *B29L 2031/529* (2013.01); *C08K 2003/265* (2013.01)

(58) Field of Classification Search
CPC ........... B29C 2945/76531; B29C 2945/76625; B29C 2945/76732; B29C 2945/76765; B29C 35/00; B29C 45/0013; C08K 3/26; C08K 5/0041; C08K 5/053; C08L 67/04; C08L 51/04
See application file for complete search history.

(56) References Cited

U.S. PATENT DOCUMENTS

| | | | |
|---|---|---|---|
| 2005/0014870 A1* | 1/2005 | Sato | C08L 67/04 524/492 |
| 2009/0162580 A1* | 6/2009 | Dontula | B41M 5/52 428/32.39 |
| 2009/0221755 A1* | 9/2009 | Aoki | A01K 15/025 |
| 2010/0143625 A1* | 6/2010 | Steele | C08G 75/024 264/233 |
| 2014/0155528 A1* | 6/2014 | Onoue | C08L 101/00 524/127 |
| 2016/0185955 A1* | 6/2016 | Chen | B41M 5/52 428/32.39 |
| 2016/0242391 A1* | 8/2016 | Stone | A01K 15/025 |
| 2018/0154564 A1* | 6/2018 | Ogawa | C08J 9/36 264/322 |

FOREIGN PATENT DOCUMENTS

| | | | | |
|---|---|---|---|---|
| CN | 102206406 A | 10/2011 | | |
| EP | 1445282 A1 * | 8/2004 | ............. | C08L 67/04 |

* cited by examiner

POLYLACTIC ACID MOULDING PROCESS

BACKGROUND

Field

Embodiments of the present invention relate to a manufacturing process for fully bio-based bio-plastic durable consumer products, including a process of manufacturing bio-based bio-plastic baby toys and baby products using highly crystallized polylactic acid biopolymers and injection molding techniques.

Background

Bisphenol A (BPA), polyvinyl chloride (PVC), phthalates, styrenes, and heavy metals are well-known health offenders associated with oil-based plastics. Exposure to these substances, and others in oil-based plastics, can cause health problems in individuals. For example, these substances can act as hormone disruptors linked to possible reproductive problems and birth defects. These substances can also be carcinogens that accumulate in animals and in humans. Certain substances are known neurotoxins with other negative health effects. Toxic heavy metals, such as lead, may be found in the paints and coatings of wood and plastic toys. These harmful materials may be present in everyday plastic items, including toys. There is a growing awareness worldwide to reduce the exposure of babies and small children to such potentially toxic petrochemicals and heavy metals.

Polylactic acid (PLA) biopolymers are not a petroleum or oil based product. Unlike many oil-based plastics, PLA biopolymers do not contain, BPA, PVC, phthalates, styrenes, or heavy metals.

Resins produced with PLA biopolymers have a variety of uses. Some non-crystallized PLA biopolymer products are not suitable for durable consumer product applications, because they do not have the durability of comparable oil-based plastic products. Because non-crystallized PLA biopolymer products typically start to deform around 50° C. ambient temperatures, these products may not be suitable for day-to-day use in hot climates and/or transport in non-climate controlled ships, vehicles, or controlled warehouses. PLA consumer products manufactured according to conventional injection moulding techniques are often too brittle and prone to deformation in real-life use conditions due to their low heat resistance.

SUMMARY

Provided herein are methods and systems of processing PLA biopolymers to utilize PLA biopolymers as a replacement for oil-based plastics. The methods and systems disclosed can increase the utility of products manufactured with PLA biopolymers by increasing durability and producing a product that is less malleable at room temperatures.

According to the present invention, moulded products may be produced using fully biobased PLA biopolymers without adding petrochemicals or other agents containing heavy metals, but by using other biobased additives. The resulting products are fully biobased with increased heat resistance, durability, and visual appeal. Products manufactured according to the present invention are more durable as compared to PLA products made with conventional injection molding methods. Specifically, products manufactured according to the present invention have improved heat resistance.

DETAILED DESCRIPTION

The present invention will now be described in detail with reference to embodiments thereof as illustrated in the accompanying drawings. References to "one embodiment," "an embodiment," "an example embodiment," "some embodiments," etc., indicate that the embodiment described may include a particular feature, structure, or characteristic, but every embodiment may not necessarily include that particular feature, structure, or characteristic. Similarly, other embodiments may include additional features, structures, or characteristics. Moreover, such phrases are not necessarily referring to the same embodiment. When a particular feature, structure, or characteristic is described in connection with the embodiment, it is submitted that it is within the knowledge of one skilled in the art to effect such feature, structure, or characteristic in connection with other embodiments whether or not explicitly described.

The term "invention" or "present invention" as used herein is a non-limiting term and is not intended to refer to any single embodiment of the particular invention but encompasses all possible embodiments as described in the application.

As used herein when referring to any numerical value, the term "about" or "approximately" means a value falling within a range that is ±10% of the stated value. For example, "about 50° C." encompasses a range of temperatures from 45° C. to 55° C., inclusive.

The methods and systems disclosed herein can be used to produce durable products or parts thereof using PLA biopolymers.

The products, methods, and systems disclosed herein present PLA biopolymer resins that may be suitable for consumer goods. However, the disclosed embodiments are not limited to use solely for consumer goods. Some embodiments of the present invention are described below with reference to the accompanying figures.

Figure 1:
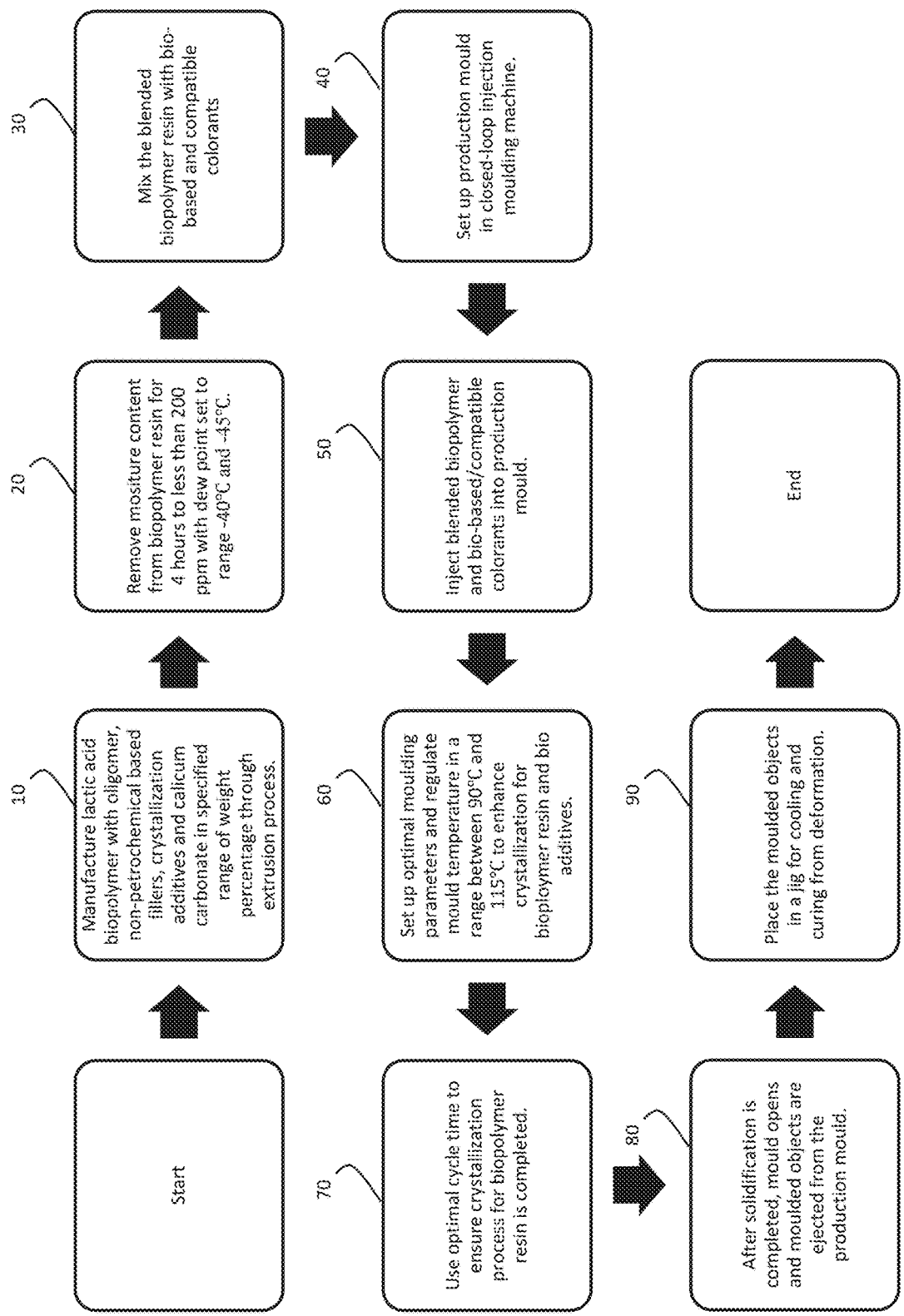
FIG. 1 is a flow diagram illustrating a method of moulding a PLA biopolymer product according to various aspects of the invention.

FIG. 1 illustrates an example method for producing a product using PLA biopolymer according to an aspect of the invention. The method illustrated in FIG. 1 is representative of a method to produce a PLA biopolymer according to an aspect of the present invention and should not be construed as limiting the scope of the present invention. Products, times, temperatures, and other production parameters are shown in FIG. 1. However, it is submitted that different products, such as those described herein, and other production parameters may be included or changed without departing from the spirit of the present invention.

At step 10, a resin is formed by combining biopolymers and other materials. The biopolymers may include PLA biopolymers. Other bio-based biopolymers such as PHA, fully bio-based PBS or PHBV may be used in addition to or in place of the PLA biopolymer. Other materials include starches, non-petrochemical based fillers, non-petrochemical based nucleating, or crystallization agents.

Highly crystallized PLA resins are more durable against mechanical shocks and have significantly higher heat resistance as compared to non-crystallized (amorphous) PLA resins. In one aspect of the invention, additives are blended into the resin to increase the crystallization rate of the PLA resin. A PLA resin can be formed by blending a crystallization agent and PLA. The PLA resin may also include one or more coloring agents. Colorants, such as OnColor™ Bio type colorants made by PolyOne Corporation, may be used and blended into the PLA resin as a color masterbatch. Other biodegradable non-petroleum based coloring agents may also be used to color the PLA resin. In one aspect, color masterbatch is blended into PLA resin at at least approximately a 3% ratio (that is, 3% of the resulting resin is the color masterbatch) to maximize dispersion to ensure vivid and consistent color in the resulting moulded product. In some embodiments, the ratio of color masterbatch to the resulting resin is from approximately 3% to approximately 6% or from approximately 1% to approximately 4%. The amount of color masterbatch added to the resin may be dependent upon colorant characteristics, the particular color sought, or a particular brightness or depth of the color sought.

The addition of certain materials may increase the rate of crystallization of a PLA biopolymer blended resin. In an aspect of the invention, additional materials can be lactic acid oligomers containing free hydroxyl and/or carboxyl terminal functional groups. In another aspect of the invention, the above mentioned lactic acid oligomers contain at least one esterified hydroxyl and/or carboxyl terminal functional groups.

The resulting PLA blended resin may be used in an injection moulding process to produce a product. In one aspect of the invention, the proportion by weight of the lactic acid oligomers and/or other bio-additives compared to the total weight of the mixture is in the value range from approximately 1% to approximately 15%. For example, the proportion of lactic acid oligomers may be approximately 5%. In some embodiments, the ratio may be from approximately 3% to approximately 6% or from approximately 12% to approximately 15%. In another aspect of the invention, the proportion by weight of the polylactic acid polymer compared to the total weight of the mixture is in the value range from approximately 85% to approximately 99%. In another embodiment, it is in the value range from approximately 70% to approximately 98%

Non-petrochemical based fillers can be added further to this material blend to enhance cost efficiency of the blend in aggregate and to improve impact resistance of the blended resin. In one aspect of the invention, non-petrochemical based fillers can be Calcium Carbonate. In another aspect of the invention, the proportion by weight of Calcium Carbonate compared to the total weight of the mixture can be a range from approximately 1% to approximately 20%, approximately 1% to approximately 15%, such as approximately 5% to approximately 15%, such as approximately 10%. In another aspect of the invention, the proportion by weight of the polylactic acid polymer compared to the total weight of the mixture can be a range from approximately 65% to approximately 98%, such as approximately 70% to approximately 95%, such as approximately 75% to approximately 90%, such as approximately 85%.

A main object of the resin processing techniques is to increase the rate of crystallization of the PLA biopolytner in the resin. Highly crystalized PLA biopolymers have higher heat resistance and are more durable against mechanical shock.

As shown at step 20 of FIG. 1, the moisture content of the blended resin is reduced. In one aspect, the blended PLA resin's moisture is reduced using in-line drying. Dehumidifier type resin drying machines may also be used to dry the blended PLA resin. A moisture content of less than approximately 0.020% (200 ppm) can prevent viscosity degradation in the PLA resin during plastic injection. In one aspect, drying conditions can be at approximately 60° C. for approximately four hours with dew point set to approximately −40° C. In one aspect, drying conditions can be at approximately 60° C. for approximately four hours with dew point set to approximately −45° C. In one aspect, drying conditions can be at approximately 60 degrees Celsius for approximately four hours with dew point in a range from approximately −40° C. to approximately −45° C. In another aspect, drying conditions include an airflow rate greater than approximately 0.5 cfm/lb (0.032 m$^3$/min per kg) of PLA resin. In another aspect, the resin is not exposed to atmospheric conditions after drying.

At step 30, a colorant is added to the blended resin. Steps 40 and 50 describe the setup and injection of the PLA resin into a mould to form the PLA resin into an object. In some embodiments, the mould has high strength and toughness, and has a surface treatment greater than approximately 50 HRC on the Rockwell scale. The mould may be made of a material to accommodate high crystallization PLA resin including, but not limited to, steel.

Figure 2:
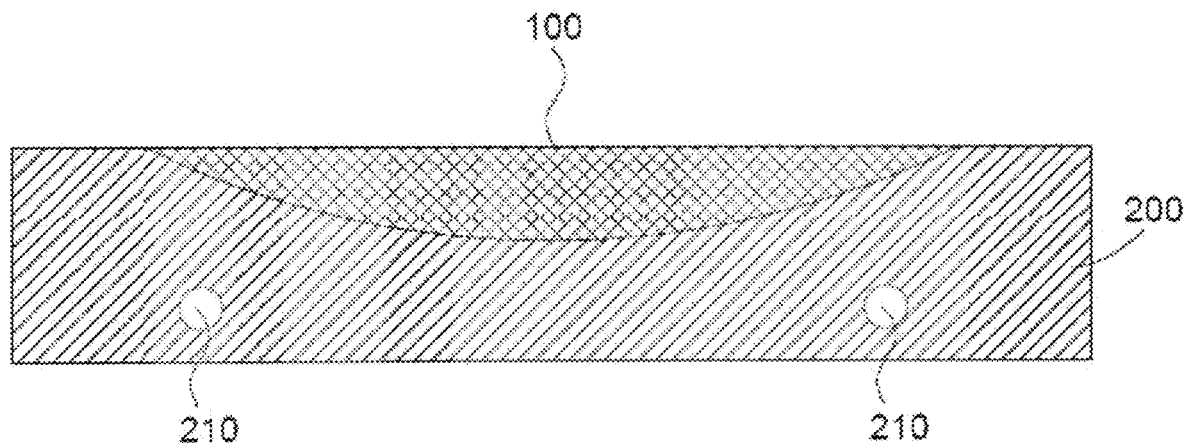
FIG. 2 is an illustration of a mould and PLA biopolymer resin according to various aspects of the invention.
Figure 3:
FIG. 3 is a perspective view of a consumer product according to various aspects of the invention.
Figure 4:
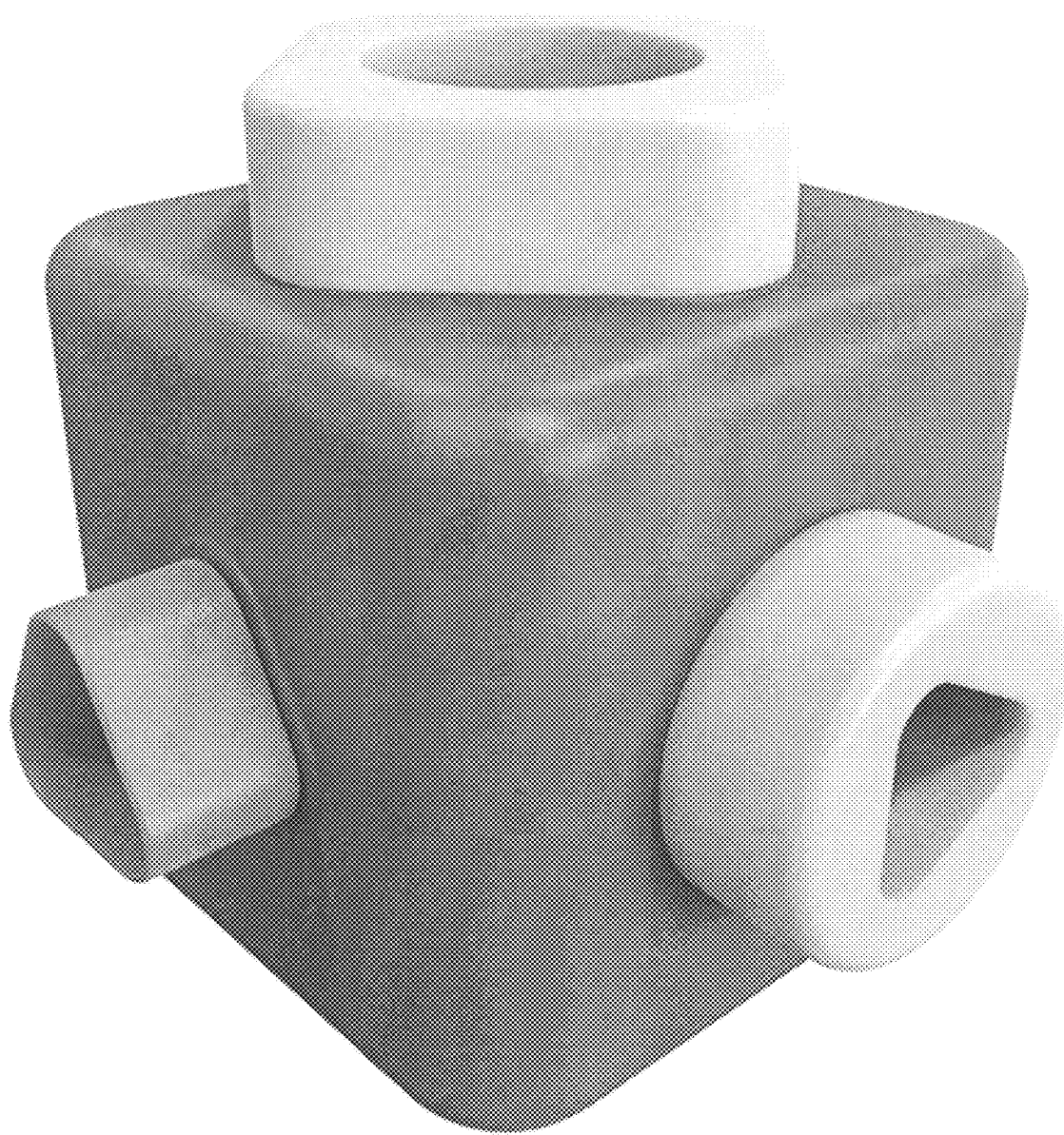
FIG. 4 is a perspective view of a consumer product according to various aspects of the invention.
Figure 5:
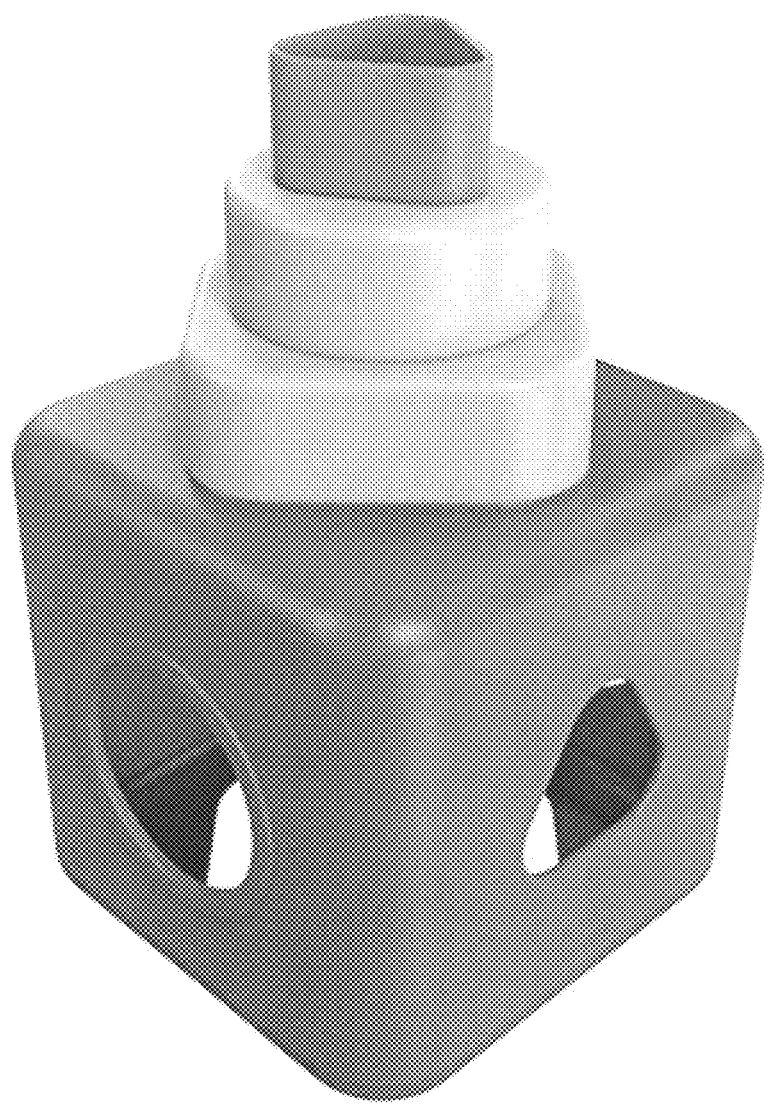
FIG. 5 is a perspective view of a consumer product according to various aspects of the invention.
Figure 6:
FIG. 6 is a perspective view of a consumer product according to various aspects of the invention.
Figure 7:
FIG. 7 is a right view of a consumer product according to various aspects of the invention.
Figure 8:
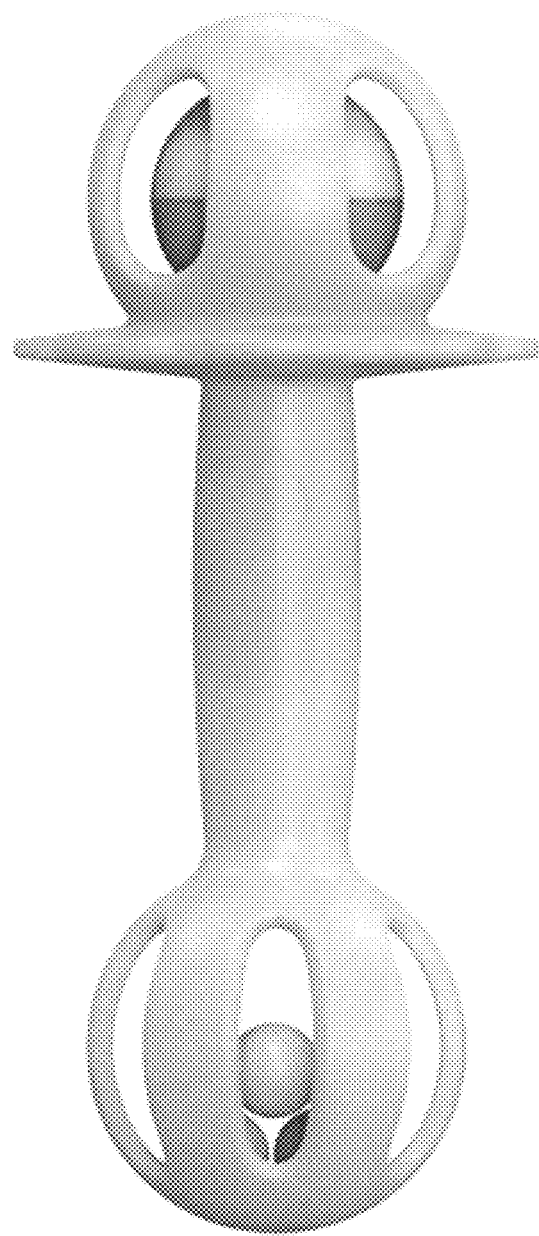
FIG. 8 is a left view of a consumer product according to various aspects of the invention.
Figure 9:
FIG. 9 is a perspective view of a consumer product according to various aspects of the invention.
Figure 10:
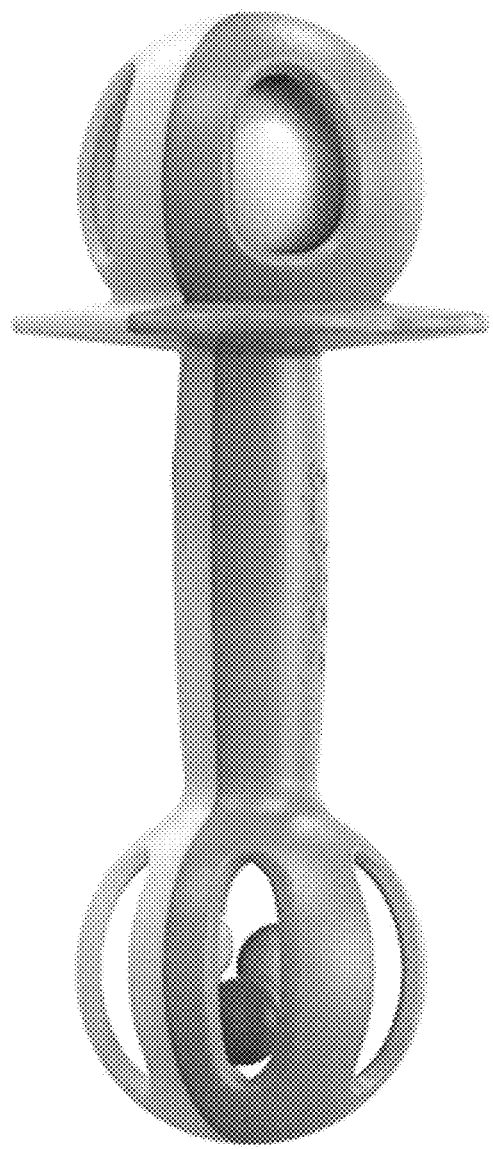
FIG. 10 is a front-right view of a consumer product according to various aspects of the invention.
Figure 11:
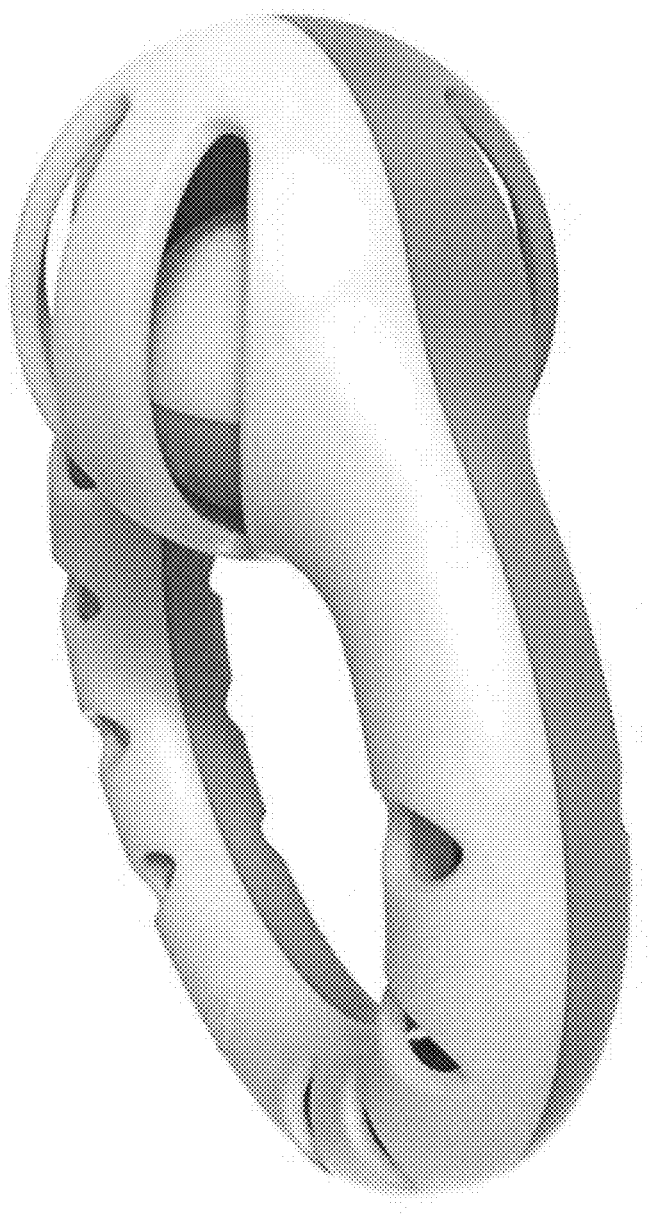
FIG. 11 is a perspective view of a consumer product according to various aspects of the invention.
Figure 12:
FIG. 12 is a right view of a consumer product according to various aspects of the invention.
Figure 13:
FIG. 13 is a left view of a consumer product according to various aspects of the invention.
Figure 14:
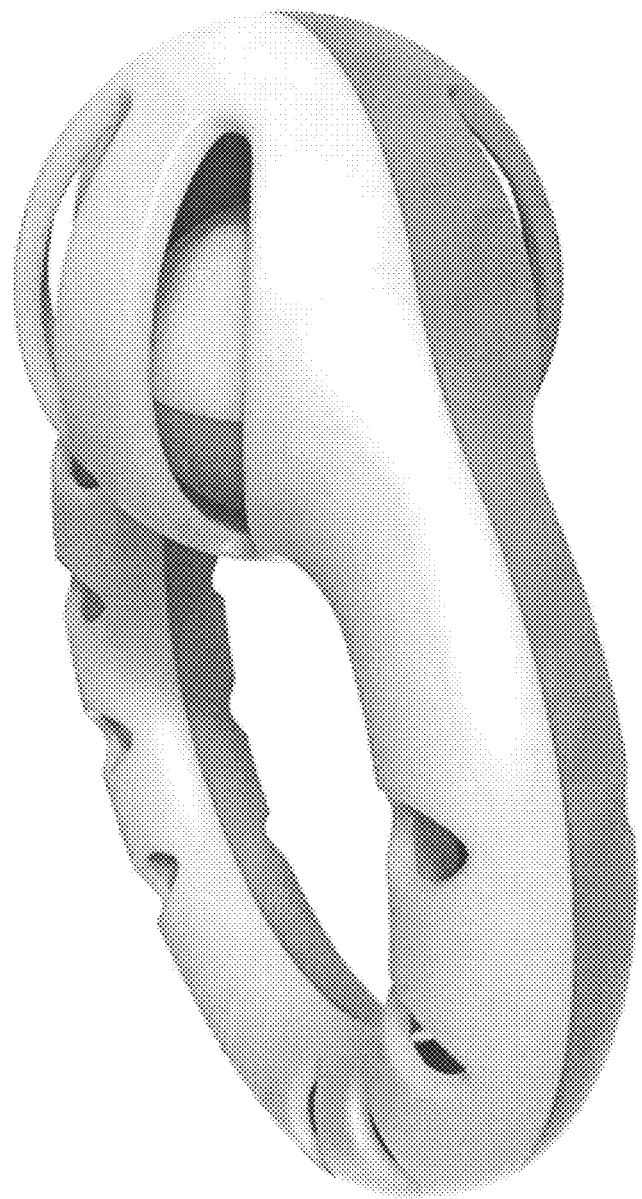
FIG. 14 is a perspective view of a consumer product according to various aspects of the invention.
Figure 15:
FIG. 15 is a front view of a consumer product according to various aspects of the invention.
Figure 16:
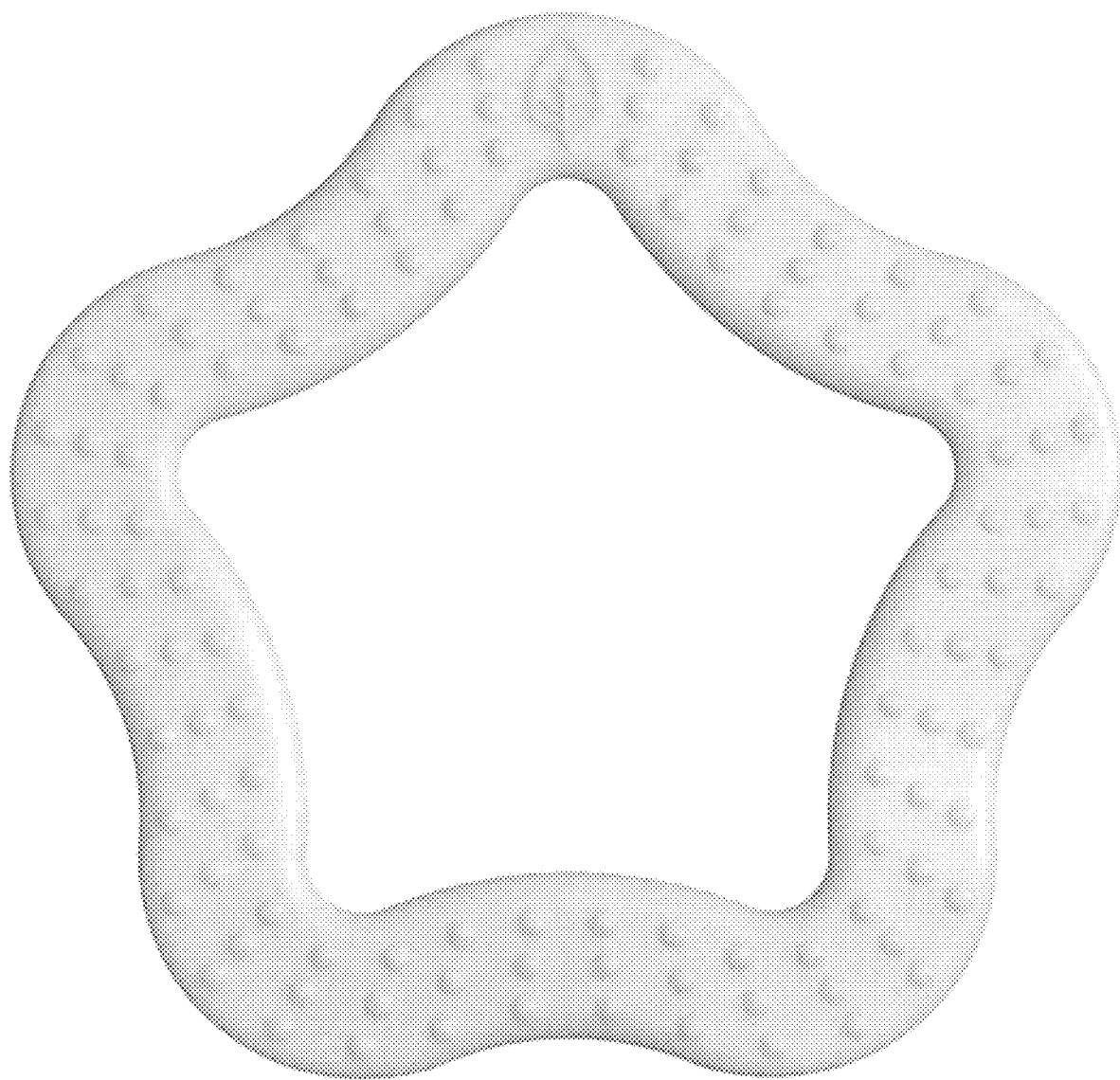
FIG. 16 is a front view of a consumer product according to various aspects of the invention.
Figure 17:
FIG. 17 is a front view of a consumer product according to various aspects of the invention.

At step 60, the mould temperature can be maintained. In one aspect, shown in FIG. 2, mould 200 can be heated using high temperature oil flowing through oil intakes 210 to maintain the mould temperature and form PLA resin 100 into an object. In another aspect, the mould can include an oil-heating runner to maintain a steady temperature of the mould. In another aspect, the mould can include approximately two or more groups of heating oil runners to ensure that the mould temperature can be controlled within ±2 degrees Celsius.

Surface imperfections in the mould may be less than approximately 0.02 mm to reduce uneven temperature zones. This dimensional accuracy can eliminate the use of fins and ensure a good exhaust effect when injecting resin at high temperature. In one aspect, hot runner mould designs are used to improve temperature stability of the mould. In another aspect, the mould can be equipped with an oil-heating mould temperature controller. The power of the controller is determined by the size of the mould and the injection volume. In one aspect, a temperature controller with a power of 5 kW is used to mould an object weighing less than 200 grams.

Step 70 of FIG. 1 discloses temperature modulations of the mould during the moulding process. In one aspect of the invention, the mould is pre-heated before injection of PLA resin to improve the temperature heterogeneity of the mould. The pre-heat temperature setting of the mould can be from approximately 120° C. to approximately 130° C.

When injecting the PLA resin, factors such as heat diffusion of the PLA resin and mould can reduce the temperature balance within the mould. The mould and PLA resin temperature can be balanced over a short period of time.

In one aspect, the mould temperature can be monitored throughout the PLA resin injection process. In another aspect, the mould temperature can be adjusted and/or maintained by adjusting the heating oil temperature and flow through the mould. In one aspect, temperature sensors and programmable logic controllers can be used to provide constant electronic monitoring and adjustment of mould surface temperatures.

In an aspect of the invention, a thermal-isolating layer can be provided between the mould and the molding machine template during the PLA resin injection process. This thermal-isolating layer can slow and reduce heat loss from the mould to avoid excessive mould temperature fluctuations.

In an aspect of the invention, injection molding parameters can be as follows:

| Processing Condition | Setting |
| --- | --- |
| Feed Throat | Temperature of approximately 20° C. to approximately 40° C. |
| Convey Section | Temperature of approximately 170° C. to approximately 210° C. |
| Compression Section | Temperature of approximately 180° C. to approximately 220° C. |
| Metering Section | Temperature of approximately 180° C. to approximately 220° C. |
| Nozzle | Temperature of approximately 180° C. to approximately 220° C. |
| Back Pressure | Approximately 50 psi to approximately 300 psi |

In an aspect of the invention, injection temperatures for the PLA resin follow a bell shaped temperature curve, rather than a linear temperature curve. The temperature can be increased to glass transition temperatures up to the metering section. Then, the temperature can be lowered in the nozzle section by at least 30° C. A high temperature differential between the nozzle, gates and the mold can adversely affect the PLA crystallization. A smoother temperature curve between the nozzle section, runners/gates, and mould can ensure optimum PLA crystallization.

In one aspect, the mould inner wall temperature can range from approximately 90° C. to approximately 115° C. In another aspect, the mould inner wall temperature can range from approximately 100° C. to approximately 105° C. In a further aspect, the mould inner wall temperature can be approximately 100° C. In one aspect, the temperature may cycle between highs and lows. In yet another aspect, the highs and lows of the cycle may change during the moulding process.

The PLA resin injection flow can be a low to medium speed with meso-high pressure. PLA resin crystallization can be adjusted by adjusting the PLA resin cooling time in the mould. The time for PLA resin crystallization can depend on the injection volume, geometry, thickness, and mass of the desired object. In one aspect of the invention, the PLA resin crystallization time in the mould can range from approximately 25 seconds to approximately 65 seconds. In one aspect, a 130 g PLA resin object can crystallize in the mould for at least approximately 35 seconds.

At step 80, the PLA resin object is ejected from the mould. In one aspect of the invention, a one-point object ejection design can be avoided to prevent deformation during demoulding, because the PLA resin can still be malleable until it fully cools.

At step 90, the PLA resin object can be placed in a jig. In an aspect of the invention, the PLA resin object can be removed from the mould and immediately placed in a jig to cool. The jig design and geometry can match the geometry of the mould to minimize post molding deformation of the object. The appropriate cooling time of the PLA resin object in the jig can depend on the geometry and size of the object. In one aspect, the object can cool in the jig for at least approximately two hours.

In one aspect, the surface of the mould can be laser or chemically etched to have a micro-patterned surface. This micro-patterned mould surface can impart a matte surface to the finished object that is resistant to scratch marks and dents. The surface effect can also enhance the appearance of the finished produce without the use of a chemical based surface finish or anti-scratch coating.

Parts and finished products manufactured according to the present invention are made from a highly crystallized PLA resin. Resulting parts and products are significantly more durable compared to PLA parts and products made with conventional injection molding methods, especially in terms of heat resistance. Parts and finished products manufactured according to the present invention are heat resistant to at least approximately 50° C., and up to approximately 90° C.

In addition, parts and finished products manufactured according to the present invention can be tested and certified as 100% biobased—based on ASTM 6866-12 testing method.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the claims and their equivalents.

What is claimed is:

1. A method for manufacturing an object, the method comprising:
creating a blended resin by combining a crystallization agent and a polylactic acid polymer;
reducing a moisture content of the blended resin to a threshold;
creating an object by heating a mould to a mould temperature between 105° C. and 115° C.;
after achieving the mould temperature between 105° C. and 115° C., injecting the blended resin into the mould to maintain the mould temperature between 105° C. and 115° C.;
monitoring the mould temperature;
adjusting the rate of heat transfer to the mould in response to the monitored mould temperature, wherein adjusting the rate of heat transfer into the mould is effectuated by changing the rate of flow of an oil thermally coupled to the mould while creating the object;
after creating the object, ejecting the object from the mould with multiple discrete contact points for object ejection; and
placing the object in a jig to cool and harden after ejecting the object from the mould.

2. The method of claim 1, wherein the crystallization agent is a lactic acid oligomer.

3. The method of claim 2, wherein the lactic acid oligomer comprises one of a free hydroxyl and/or carboxyl terminal functional groups.

4. The method of claim 2, wherein the lactic acid oligomer comprises one of an esterified hydroxyl and/or carboxyl terminal functional groups.

5. The method of claim 1, wherein the crystallization agent comprises from about 1% to about 15% by weight of the blended resin.

6. The method of claim 1, wherein the blended resin further comprises a non-petrochemical based filler, and wherein the non-petrochemical based filler comprises from about 1% to about 20% by weight of the blended resin.

7. The method of claim 6, wherein the non-petrochemical based filler is Calcium Carbonate.

8. The method of claim 1, wherein the polylactic acid polymer comprises from about 65% to about 98% by weight of the blended resin.

9. The method of claim 1, wherein the blended resin further comprises a biodegradable colorant.

10. The method of claim 1, wherein reducing the moisture content comprises: drying the blended resin in a closed-loop desiccant dryer, wherein the threshold is approximately 0.020% moisture content with a dew point in a range from about −40 degrees Celsius to about −45 degrees Celsius.

11. The method of claim 1, wherein reducing the moisture content comprises drying the blended resin for at least about four hours.

12. The method of claim 1, wherein reducing the moisture content comprises circulating air around the blended resin in a closed-loop system.

13. The method of claim 12, wherein the air circulates at a rate of approximately 0.5 cubic foot per minute per pound of blended resin.

14. The method of claim 1, wherein the mould comprises a thermal-isolating layer.

15. The method of claim 1, wherein the object is a toy.

16. The method of claim 1, wherein surface imperfections of the mould are less than approximately 0.02 mm.

17. The method of claim 1, wherein the surface of the mould is etched to have a micro-patterned surface.

18. The method of claim 1, wherein the mould includes a surface treatment greater than approximately 50 HRC on the Rockwell scale.

19. The method of claim 9, wherein the blended resin comprises from approximately 3% to approximately 6% by weight of the biodegradable colorant.

* * * * *